3,385,666
DIOXYGENYL FLUORIDES OF GROUP V ELEMENTS
Archie R. Young II, Montclair, Tetsuyuki Hirata, Wharton, and Scott I. Morrow, Morris Plains, N.J., assignors to Thiokol Chemical Corporation, Bristol, Pa., a corporation of Delaware
No Drawing. Filed Jan. 6, 1964, Ser. No. 336,061
11 Claims. (Cl. 23—203)

This invention relates to a novel class of fluorinated, oxygen containing, oxidizing agents and to a process for their preparation.

More particularly, this invention concerns the preparation of certain stable fluorides of the cationic dioxygenyl radical. These novel-oxidizing agents have the formula:

$$O_2MF_6$$

wherein ($O_2$) is the dioxygenyl radical having a charge of +1, M is an element selected from the group consisting of phosphorus, arsenic antimony and bismuth.

The novel compounds of this invention have utility as oxidizing agents, particularly in aqueous environments. The reaction of the inventive dioxygenyl fluorides with water is as follows:

$$2O_2MF_6 + H_2O \rightarrow O_2 + O_3 + 2HMF_6$$

wherein M is a Group V element selected from the elements consisting of P, As, Sb, and Bi.

Because of the concurrent liberation of both $O_2$ and $O_3$ as typified by the reaction of the Group V dioxygenyl fluorides with water, the novel compositions have application for a variety of oxidizing uses. For example, the compositions of this invention can be used as additives or components in solid and liquid bleaches for both industrial and household application.

In addition, these novel dioxygenyl compounds can be used to produce the powerful oxidizer the nitronium ion from nitrogen dioxide. For example, the arsenic compound oxidizes $NO_2$ as follows:

$$O_2AsF_6 + NO_2 \rightarrow O_2 + NO_2AsF_6$$

The novel compounds of this invention are both unusual and advantageous in several respects. For example, the compositions represent a novel and relatively stabilized form of the dioxygenyl cation ($O_2^+$). While a synthesis of the dioxygenyl platinum hexafluoride has been recently reported in Proc. Chem. Soc., p. 115 (1962) the method of preparation described in the pulbication differs substantially from the method used in this inventive process. In fact the published process used to prepare the prior art compounds cannot be used to prepare the compounds of this invention but is limited exclusively to fluorides such as $PtF_6$ and $RhF_6$ that are exceedingly powerful oxidizing agents.

With the above unusual characteristics and uses in mind, it is an object of this invention among others to prepare stable, heretofore unreported salts of the dioxygenyl [$O_2^+$] cation by the reaction of dioxygen difluoride with the simple fluorides of the elements of Group V of the Periodic Table.

Another object of this invention is to prepare novel and potent oxidizing agents useful for a variety of purposes.

A further object of this invention is to prepare a group of novel compositions that can be used as a source of both ozone and oxygen.

An additional object of this invention is the preparation of the nitronium ion and intermediates for preparing novel nitronium salts.

Further objects of this invention will become apparent to the reader upon a further reading of this patent application.

The above objects among many others are achieved by the direct interaction of certain fluoride reactants with dioxygen difluoride at reaction temperatures well below 0° C. As indicated earlier the fluoride reactant is selected from the group consisting of Group V fluorides.

The preferred practice is to contact the fluoride reactant with an excess of $O_2F_2$ at low temperatures ranging from −160 to −78° C. until a substantial amount of product is formed. The product is isolated after evacuating off the excess $O_2F_2$, fluorine and gaseous by-products.

In one favored process embodiment of this invention a fluoride reactant chosen from the preferred phosphorus, arsenic and antimony fluoride reactants are reacted with an excess of $O_2F_2$ until the desired product is formed. For example an illustration embodiment of the preferred process is to contact $AsF_5$ with an excess of $O_2F_2$ (the $O_2F_2$ is generated by passing a 10,000 volt D.C. discharge through an equimolar mixture of $O_2$ and $F_2$ maintained at 20 mm. pressure and −196° C. temperature) until a substantial quantity of product is formed. The end point of the reaction and the course of the reaction can be followed by the disappearance of the orange color of the $O_2F_2$ reactant, as well as by measuring the free fluorine evolved during the reaction.

In another preferred process embodiment of this invention, $SbF_5$ is contacted with an excess of $O_2F_2$ prepared as described above until visual appearance indicate the formation of the $O_2SbF_6$ product. The product can be isolated after evacuating the excess $O_2F_2$ from the system.

In yet another preferred embodiment of this invention $PF_5$ is contacted with an excess of $O_2F_2$ prepared by the described gaseous discharge method at about −165° C. until the dissipation of the orange color of the $O_2F_2$ indicates that a reaction has taken place. Again evacuation of the system is a convenient means of isolating and purifying the product.

In yet another preferred embodiment, $BiF_5$ is reacted with excess $O_2F_2$ gas at temperatures below −160° C. until it appear as though the reaction is completed. These preferred embodiments of the invention involving the preparation of the Group V fluorides of the dioxygen cation are described in greater detail in the examples of this application which follow infra.

As indicated supra the process of this invention can be used to prepare dioxygenyl fluoride salts generally. In the generic process the dioxygenyl fluoride reactant in excess is contacted with a source of the desired fluoride cation at the low temperatures described earlier until the orange color of the $O_2F_2$ is dissipated to produce the desired product.

As indicated by the illustrative process embodiments described above, there is considerable latitude in so far as reaction conditions and reactants and the ratio of reactants are concerned. For example, while the reaction should preferably be run at temperatures below or about the melting point of $O_2F_2$ (−160° C.) a somewhat broader temperature range (−160° C. to −78°) can be used. Under the conditions of temperatures and pressure favored the reaction is substantially completed within 3 hours after the reactants are brought together. However depending upon the individual reactants and temperatures employed the reaction time can be extended or reduced considerably.

The ratio of the two reactants is not critical to the operability of the process. However, especially favorable results have been obtained when a large excess of the dioxygendifluoride over the stoichiometric equimolar ratios are used and for this reason a large excess of this reactant is preferred.

The novel dioxygenated salts of this invention are white to yellowish white solids at room temperature. The phosphorus compound is fairly stable at room temperature but can be stored at lower temperatures (below −80° C.) without significant degradation for long periods of time. The anhydrous arsenic and antimony compounds are stable for periods of up to several weeks at room temperature. Mass spectral evidence indicates that all of the Group V compounds decompose upon heating as follows:

$$2O_2MF_6 \rightarrow 2O_2 + F_2 + 2MF_5$$

wherein M is an element selected from Group V of the Periodic Table.

Infrared spectra taken on the compounds show absorptions due to the anions $MF_6$.

The dioxygen-difluoride reactant is prepared by the discharge method of Kirschenbaum and Grosse, J.A.C.S. 81, 1277 (1959). The P, As, Sb, and Bi pentafluorides are known chemicals of commerce.

Further advantages and uses of the inventive compositions are shown by the illustrative examples which follow:

Example 1.—Preparation of $O_2PF_6$

A 0.5 millimole of $PF_5$ is condensed as a white solid on the bottom of an all glass vacuum apparatus kept at −196° C. The apparatus is joined to a gas trap having a pair of copper electrodes sealed in the trap and connected to a source of DC current. An equi-molar mixture of $O_2$ and $F_2$ maintained at 10 mm. pressure is brought into contact with the electrodes which are charged by passing 10,000 volts of DC current through them forming $O_2F_2$. An excess of the $O_2F_2$ which is formed is brought into contact with $PF_5$ at −100° C. The discharge of orange color from the $O_2F_2$ is a visual indication that the reaction is substantially complete. The trap containing the product and excess $O_2F_2$ is brought to −80° C. and pumped under vacuum for one hour. The product is a white solid which is characterized from its decomposition products at room temperature ($O_2PF_6 \rightarrow O_2 + \frac{1}{2}F_2PF_5$).

Example 2.—Preparation of $O_2AsF_6$

The same apparatus and procedure is used as described in Example 1 except that one millimole of $AsF_5$ is substituted for the $PF_5$ at −160° C. until the orange color of the $O_2F_2$ reactant is largely dissipated. This takes approximately 3 hours. At the end of this time the temperature of the product is raised to −80° C. for 2 hours and is pumped under high vacuum for an additional three hours.

Infra-red analysis shows the characteristic absorption spectra reported for the hexafluoroarsenate ion at 705 cm.$^{-1}$. Arsenic and fluorine analysis of aqueous solutions yield the following data:

*Analysis.*—Calculated for $O_2AsF_6$: As, 33.91; F, 51.60. Found: As, 33.86; F, 51.11.

The product liberated a mixture of oxygen and oxone when reacted with water.

The results are:

| Wt. $O_2AsF_6$, g. | Total $O_2$ and $O_3$ found, millimole | Total $O_2$ and $O_3$ calculated, millimole |
|---|---|---|
| 0.1728 | 0.790 | 0.785 |
| 0.1608 | 0.791 | 0.729 |

Table I which follows gives the X-ray diffraction patterns of the product.

TABLE I.—DIFFRACTION PATTERNS OF $O_2AsF_6$

| Cubic Unit Cell $a_0 = 8.00 \pm .02$ A. | | $O_2AsF_6$ | |
|---|---|---|---|
| h, k, l | d, A. (Calcd.) | d, A. | $I/I_0$ (Rel.) |
| 111 | 4.62 | 4.60 | 100 |
| 200 | 4.00 | 3.99 | 100 |
| 220 | 2.83 | 2.83 | 50 |
| 311 | 2.41 | 2.43 | 10 |
| 222 | 2.31 | 2.32 | 20 |
| ------ | ---- | 2.10 | 5 |
| 400 | 2.00 | 2.01 | 10 |
| ------ | ---- | 1.93 | 4 |
| 331 | 1.83 | 1.85 | 10 |
| 420 | 1.79 | 1.80 | 20 |
| 422 | 1.63 | 1.64 | 20 |
| 333, 511 | 1.54 | 1.55 | 15 |
| ------ | ---- | 1.49 | 6 |
| 440 | 1.42 | 1.42 | 6 |
| 531 | 1.35 | 1.36 | 10 |
| 442, 600 | 1.33 | 1.34 | 10 |
| 620 | 1.27 | 1.27 | 5 |
| 533 | 1.22 | ---- | ---- |

Example 3.—Preparation of $O_2SbF_6$

The preparation of $O_2SbF_6$ is carried out using a fluoroplastic and brass apparatus similar to the all glass apparatus described in Example I. A 5 millimole portion of $SbF_5$ is weighed into the fluoroplastic tube in an inert nitrogen atmosphere. The fluoroplastic tube is attached to the vacuum system proximate to the $O_2F_2$ reactant generated by electrical discharge at −196° C., the generated $O_2F_2$ is warmed to −80° C. and vacuum distilled into the plastic tube containing the $SbF_5$ reactant kept at −196° C. The reaction mixture is warmed to −80° C. at which temperature the dioxygendifluoride melts and flows onto the solid antimony pentafluoride. The $O_2SbF_6$ is pumped under vacuum for 7 hours and stored under dry nitrogen at room temperature. Infrared spectra for the product shows characteristic absorption reported for the hexafluoroantimonate ion. Antimony and fluorine are determined on a sample of product and are found to be as follows:

*Analysis.*—Calculated for $OSbF$: Sb, 45.47; F, 42.59. Found: Sb, 46.05; F, 39.22.

The X-ray diffraction pattern of the sample is given in Table II which follows:

TABLE II.—X-RAY DIFFRACTION PATTERN OF $O_2SbF_6$

| Cubic Unit Cell $a_0 = 10.71 \pm 0.15$ A. | | $O_2SbF_6$ | |
|---|---|---|---|
| h, k, l | d, A. (Calcd.) | d, A. | I/I (Rel.) |
| ------ | ---- | 5.45 | 20 |
| 200 | 5.35 | 5.33 | 20 |
| ------ | ---- | 5.11 | 15 |
| 210 | 4.79 | 4.87 | 8 |
| ------ | ---- | 4.11 | 20 |
| 220 | 3.84 | 3.84 | 100 |
| 300, 221 | 3.52 | 3.53 | 35 |
| 310 | 3.39 | 3.39 | 5 |
| 311 | 3.23 | 3.23 | 10 |
| 222 | 3.09 | 3.16 | 15 |
| 321 | 2.86 | 2.80 | 8 |
| 400 | 2.68 | 2.68 | 12 |
| 410, 322 | 2.60 | 2.61 | 5 |
| 422 | 2.19 | 2.24 | 5 |
| 331 | 2.46 | 2.43 | 10 |
| 500, 430 | 2.14 | 2.13 | 5 |
| 511, 333 | 2.06 | 2.05 | 10 |
| 440 | 1.89 | 1.84 | 10 |
| 522, 441 | 1.82 | 1.81 | 10 |
| 620 | 1.69 | 1.70 | 10 |
| 621, 540, 443 | 1.67 | 1.67 | 5 |
| 631 | 1.58 | 1.59 | 5 |
| 711, 551 | 1.50 | 1.51 | 5 |

Example 4.—Preparation of $NO_2PF_6$

A. PREPARATION OF $O_2PF_6$

Using the apparatus described in Examples 1–3, 1.31 millimoles of $PF_5$ is reacted with excess $O_2F_2$ as described previously. The reactor is warmed to −80° C. and freed of by-products by evacuating through a trap at −196° C. The gaseous products (0.705 millimole) are condensed in the −196° C. trap and are identified as a mixture of POF$_3$, SiF$_4$ and PF$_5$.

B. PREPARATION OF NO$_2$PF$_6$

The product which remained behind in the trap is cooled to −196° C. and approximately 2 millimoles of NO$_2$ are condensed onto the solid. The reactants are allowed to warm up to 23° C. for approximately 3 hours then chilled down to −196° C. The solid residue remaining after pumping under high vacuum for 2 hours is identified by infra-red analysis as NO$_2$PF$_6$, bl its absorption at 2350 cm.$^{-1}$ (NO$_2{}^+$) and at 8.37 cm.$^{-1}$ (PF$_6{}^-$).

Example 5.—Preparation of NO$_2$AsF$_6$

Using the procedure of Example 5, a weighed sample of O$_2$AsF$_6$ (21.6 parts by weight) is reacted with excess NO$_2$ for 3 hours at 25° C. A 20.43 parts by weight portion of NO$_2$AsF$_6$ product is obtained.

We claim:
1. Dioxygenyl fluorides of the formula:

$$O_2MF_6$$

wherein (O$_2$+) is the dioxygenyl radical having a charge of +1, M is an element selected from the group consisting of phosphorus, arsenic, antimony and bismuth.

2. O$_2$PF$_6$.
3. O$_2$AsF$_6$.
4. O$_2$SbF$_6$.
5. O$_2$BiF$_6$.
6. The process of preparing dioxygenyl fluorides of group V of the Periodic Table comprising the steps of contacting a O$_2$F$_2$ reactant with a fluoride reactant of the formula MF$_5$, where M is an element selected from the group consisting of phosphorus, arsenic, antimony and bismuth, until a substantial quantity of product of the formula:

$$O_2MF_6$$

wherein M, having the value previously ascribed to it, is formed and isolating the product contained therein.
7. The process of claim 6 wherein the reaction is conducted in the presence of inert solvent.
8. The process of claim 6 wherein M is phosphorus.
9. The process of claim 6 wherein the element M is arsenic.
10. The process of claim 6 wherein M is antimony.
11. The process of claim 6 wherein M is bismuth.

No references cited.

MILTON WEISSMAN, *Primary Examiner.*